J. KEEZER.

Parallel Cultivator.

No. { 1,563, 32,567. }

Patented June 18, 1861.

Witnesses:

Inventor:

UNITED STATES PATENT OFFICE.

JOHN KEEZER, OF CHILLICOTHE, OHIO.

IMPROVEMENT IN CULTIVATORS.

Specification forming part of Letters Patent No. 32,567, dated June 18, 1861.

*To all whom it may concern:*

Be it known that I, JOHN KEEZER, of Chillicothe, in the county of Ross and State of Ohio, have invented a new and useful Improvement in Double-Row Cultivators; and I hereby declare that the following is a full, clear, and exact description of the same, reference being had to the accompanying drawings and figures of reference marked thereon, which form part of this specification.

In order that others duly skilled may be enabled to understand and construct and use my invention, I shall proceed to describe it in detail.

Figure 1:
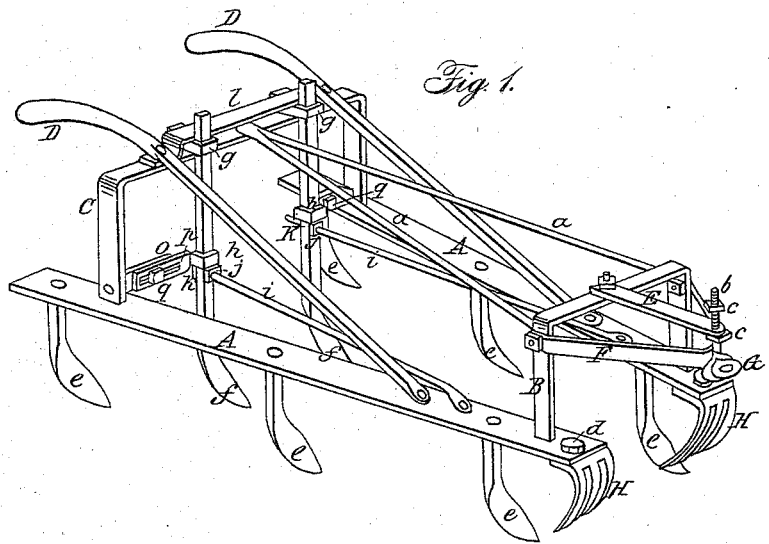
Figure 2:
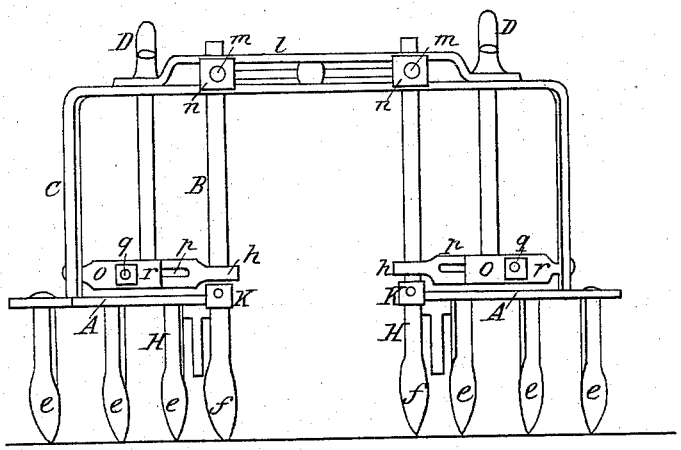

In the accompanying drawings, Figure 1 is a perspective drawing of my improved cultivator. Fig. 2 is a vertical projection of the same, viewed from the rear.

Like letters of reference designate like parts in all the drawings.

A A are the main beams, joined together in front by the gallows-frame B, and in the rear by that designated C. These frames B and C are constructed in the manner shown, in order that the implement may be used after the corn has attained a height of three feet or more, the frames passing over the tops of the crops without breaking or damaging the same.

D D are the handles, secured to the rear frame, C, and to the beams A A.

$a\ a$ are two stay-rods, attached at one end to the front frame, B, and at their other ends to center of rear frame, C.

E and F are stays connected with front frame, B, and carrying the swivel G, to which the whiffletree is attached. By means of the screw $b$ and nuts $c\ c$ the swivel G is rendered adjustable as to altitude, this adjustment securing to a limited extent a variation in the depth of cultivation.

To the fore ends of beams A A the three pronged guides H are attached by a screw-bolt and nut, $d$. These guides are adjustable laterally by means of a slot, through which the screw-bolt $d$ passes.

$e\ e\ e\ e\ e$ are cultivator-teeth, made permanently fast to beams A A. $f\ f$ are likewise cultivator-teeth, constructed each with a long shank, which, fitting in the fastenings $g$ $g\ h\ h$, are firmly held at any distance apart which may be desired. The stay-rods $i\ i$, attached to beams A A, likewise pass through shanks of cultivator-teeth $ff$, and, being formed with a screw on their ends, are secured by nuts $j\ j\ k\ k$. Larger cultivator-teeth may be substituted for those marked $ff$ in drawings.

On the upper side of rear frame, C, a strap of iron, $l$, is secured, wrought in such a manner that, together with the cross-frame itself, it forms a slot in which the fastenings $g\ g$ may slide. These fastenings are each formed with a screw-bolt, $m$, to their rear, on which the nut $n$ screws, and secures them, together with the shank of cultivator-teeth $f$, at any distance apart which may be desired.

To the lower part of sides of frame C the arms $o\ o$ are riveted, each arm being pierced with a bolt-hole.

$p\ p$ are slotted shanks, carrying each the fastening $h$, through which the shank of cultivator-teeth $f$ is passed. By means of the screw-bolt $q$ and nut $r$, passing through the slot of shank $p$ and bolt-hole in arm $o$, the fastenings $h\ h$ are fixed and retained at any required distance apart, and thus the teeth $ff$ are adjusted and maintained.

The advantages of my invention are, first, great ease of adjustment to suit the crops in various stages of growth, it being desirable in the early stages to cultivate shallow and close to the roots, while at a later period deep cultivation at a greater distance therefrom is more proper; second, the means afforded by the swivel G of upsetting the implement on edge in turning rows without interfering with the horizontal position of the whiffletrees or throwing the chains against the horses' legs; third, the power of turning short close to fences, from the absence of a tongue.

Having described my invention, I do not claim the construction of a double-row implement for cultivating high crops, as that has been used before; neither do I claim the substitution of other teeth for those marked $ff$; but

I claim—

1. Adjusting the distance between the teeth $ff$, or those used in their stead, by means of the adjustable fastenings *h h* and *g g* and stay-rods *i i*, when used in combination with the gallows-frames B and C and stay-rods *a a*, constructed and arranged substantially as and for the purpose set forth.

2. In combination with the foregoing, the stays F and E, swivel G, screw *b*, and nut *c*, when arranged in relation to each other and operated in the manner and for the purpose described.

JOHN KEEZER.

Witnesses:
 WILLIAM E. GILMORE,
 THOS. BEACH.